Dec. 29, 1931.   L. VON REIS   1,838,337
METHOD AND MACHINE FOR ROLLING PLATE GLASS
Filed Aug. 19, 1927   2 Sheets-Sheet 1

Dec. 29, 1931.  L. VON REIS  1,838,337
METHOD AND MACHINE FOR ROLLING PLATE GLASS
Filed Aug. 19, 1927  2 Sheets-Sheet 2

Inventor:
Lambert von Reis

Patented Dec. 29, 1931

1,838,337

UNITED STATES PATENT OFFICE

LAMBERT VON REIS, OF HERZOGENRATH, GERMANY, ASSIGNOR, BY MESNE ASSIGNMENTS, TO THE AMERICAN BICHEROUX COMPANY, A CORPORATION OF DELAWARE

METHOD AND MACHINE FOR ROLLING PLATE GLASS

Application filed August 19, 1927, Serial No. 214,156, and in Germany August 28, 1926.

This invention relates to the manufacture of raw plate glass, suitable for subsequent grinding and polishing, on multi-roll glass rolling machines, and it has particular reference to that kind of glass rolling in which the whole content of a melting pot is discharged and supplied in one turn to the forming rolls by which the mass is rolled into plate form.

The invention has for its object to improve the receiving means for and the feeding of the molten glass mass to the forming pass in such a manner that the mass is fed completely and quickly to the forming rolls so as to allow the latter to roll the glass mass into plate form immediately and without any appreciable loss of heat.

This object is attained by depositing the glass mass directly on the forming rolls and between additional rolls arranged above the forming rolls and defining in combination with the latter a proper receiving space for the glass mass to be rolled out. Besides, not only the forming rolls but also the additional rolls are rotatable and adjustable individually or simultaneously for allowing them to be rotated at such a speed and adjusted in such a position both before and during the rolling operation that they materially assist the feeding of the glass mass to the forming pass.

Figure 1:
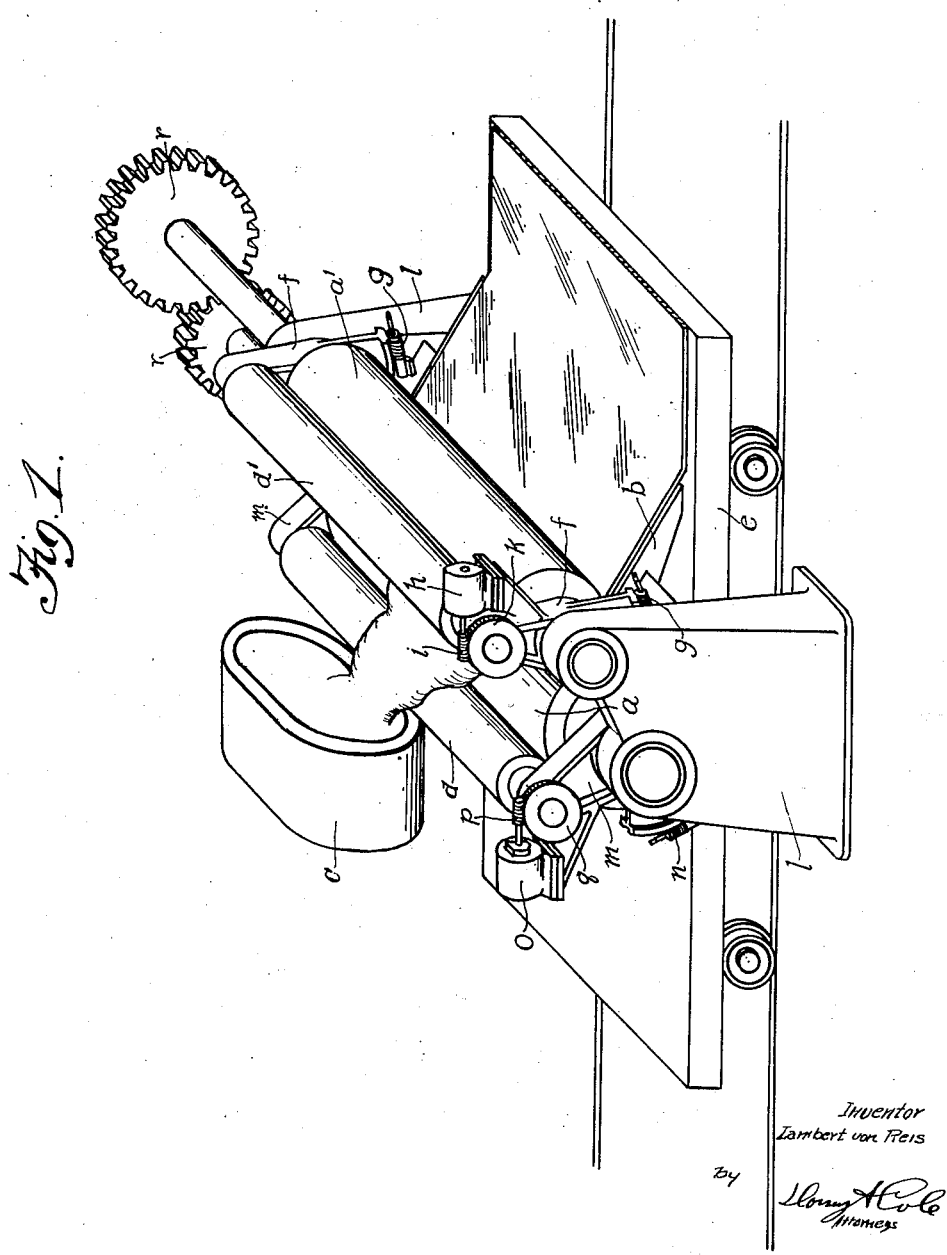
Figure 1 is a perspective view of a glass working machine embodying my invention, the various rolls being in the position when the glass melting pot is being emptied near the beginning of the rolling operation.
Figure 2:
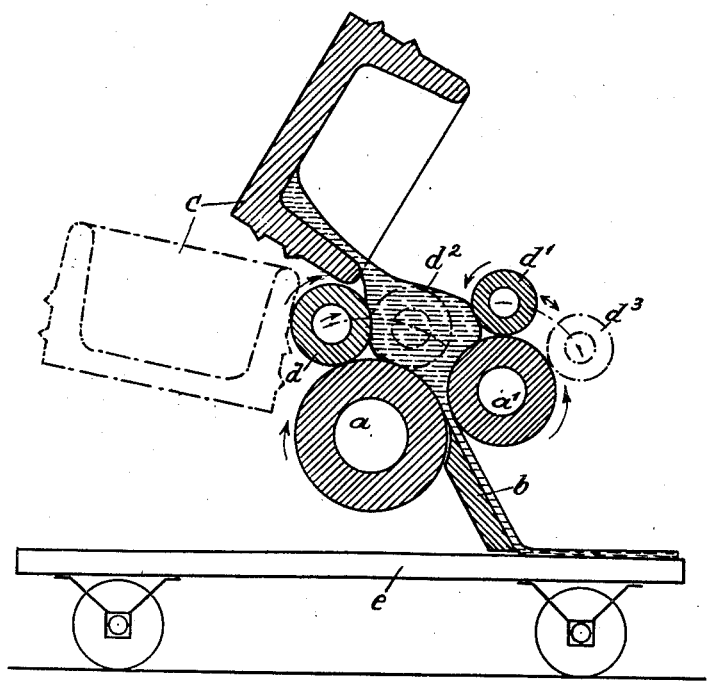
Figure 2 is a vertical section of Figure 1.

In the drawings, $a$ and $a^1$ are the forming rolls of the rolling mechanism, $b$ is a chute on which the rolled glass glides down to a transporting device, such as the truck $e$. $c$ is a melting pot. $d$ and $d^1$ are additional rolls rotatably arranged on or above the forming rolls $a$, $a^1$ and defining with the latter a receiving space for the glass mass discharged from the pot $c$. The rolls $d$, $d^1$ are adjustable, $d^2$ and $d^3$ showing the same in other positions. The forming rolls may also be adjusted so as to allow them to be inclined forwardly or rearwardly, as will be described later.

On each side of the trackway on which the transporting table $e$ moves are the supports $l$ for the various rolls of the forming machine. The adjustment of the rolls $d$ and $d'$ to or from each other is made by varying the position of the turnable frames $m$—$m$ and $f$—$f$ for the rolls $d$ and $d'$ respectively by the screws $n$ and $g$. The control of the position of the rolls $d$ and $d'$ is therefore independent of each other and of the forming rolls $a$ and $a'$.

The drive for the various rolls is as follows: The forming rolls $a$ and $a'$ are driven by the gears $r$. The roll $d$ is driven by the motor $o$ through the worm $p$ and the gear $q$ rigidly affixed to the end of the roll. The roll $d'$ is driven by the motor $h$ by means of the worm $i$ and the gear $k$, rigidly affixed to the roll.

From the above it will be seen that the speed of rotation of the rolls $d$ and $d'$ is independent of each other and independent of the forming rolls $a$ and $a'$.

The operation is as follows:

As soon as the pot $c$ filled with the liquid glass mass has been taken from the melting furnace, it is carried to the rolling machine and positioned as closely as possible to the additional roll $d$. The pot is then emptied in one turn by tipping it over the roll $d$ so that the glass mass is deposited on the forming rolls $a$, $a^1$ in the space defined by these rolls and the additional rolls $d$, $d^1$. The forming rolls are rotating and roll the glass mass into a plate which glides down the chute $b$ to the transporting device $e$, by means of which it is carried to the annealing oven. During the rolling each additional roll $d$, $d^1$ may be rotated in the same direction as the corresponding forming roll $a$, $a^1$. Besides, any one or all of the rolls $d$, $d^1$; $a$, $a^1$ may be adjusted during the rolling as will be best in accordance with the progress of rolling.

The rotation of the additional rolls and the adjustability of all rolls will allow the glass mass to be fed completely to the forming pass of the rolls $a$, $a^1$. The feeding may further be aided in by providing the surfaces of the additional rolls with suitable flutes or ribs. Besides, suitable means may be provided for cooling or heating the additional rolls in such a manner that the guarantee for a perfect supply of the glass mass to the forming pass is still increased.

The invention affords the following particular advantages:

(1) It is possible to bring the glass mass more closely to the forming rolls, whereby (2) The required receiving surface for the glass mass during and after the discharge is reduced.

(3) The discharged glass mass does not come into contact with the atmosphere so much as in the known methods and machines.

(4) As the liquid glass mass is deposited directly on the forming rolls throughout their entire length, the mass is worked immediately and without any appreciable loss of heat, whereby (5) Surety is given for the glass mass to be rolled out completely without any remnants of glass being left in the receiving space.

(6) Owing to the considerable loss of heat from the glass mass, the defects otherwise entailed by the rolling such as bubbles, cracks, dirt etc. in the finished product are entirely avoided or at least reduced to a minimum.

Having thus described my invention, what I claim as new and desire to secure by Letters Patent is:—

1. The method of feeding molten glass to a forming pass between forming rolls which includes delivering a mass of glass to a receiver comprising the forming rolls and feed rolls located thereabove, and rotating the feed rolls to assist in feeding the molten glass to the forming pass between the forming rolls.

2. The method of feeding glass to a forming pass between forming rolls which includes delivering molten glass to a receiver comprising the forming rolls and adjustable feed rolls located thereabove, and rotating the feed rolls while shifting them to reduce the capacity of the receiver to drive the molten glass to the forming rolls.

3. In a plate glass rolling machine the combination of co-operating forming rolls, adjustable feeding rolls mounted above said forming rolls the combined rolls forming a receiver for the molten glass, and means for rotating the said rolls and adjusting the feed rolls to vary the capacity of the receiver.

4. In a plate glass rolling machine the combination of forming rolls, adjustable feeding rolls mounted above said forming rolls to form a receiver in connection with the feeding rolls and means for revolving the feed rolls of said receiver variable in respect to the forming rolls and for adjusting them towards each other.

5. In a plate glass rolling machine, a pair of forming rolls laying in a substantially horizontal plane, an additional roll above each of the forming rolls to form a receiver for molten glass in connection with the forming rolls, with means for revolving the forming rolls and the rolls forming the receiver in the same direction.

6. In a plate glass rolling machine, the combination of co-operating forming rolls, feed rolls mounted above said forming rolls to form with the forming rolls a receiver for molten glass, and means for rotating all of said rolls and adjusting the feed rolls to each other to vary the capacity of the receiver.

In testimony whereof I have signed my name to this specification.

LAMBERT von REIS.